Aug. 21, 1951 A. J. ZAK 2,565,289
FLUID POWER TRANSMISSION
Filed March 8, 1948
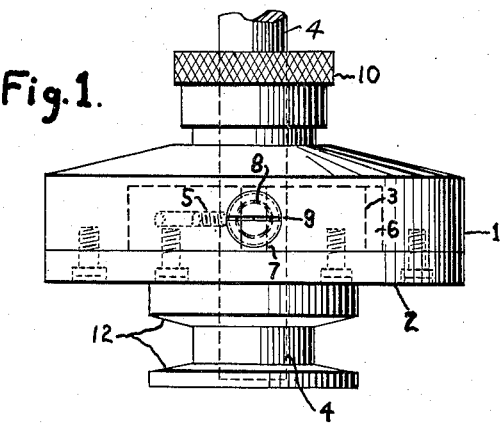
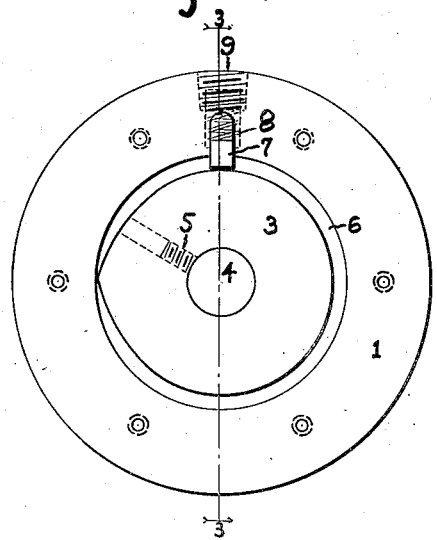 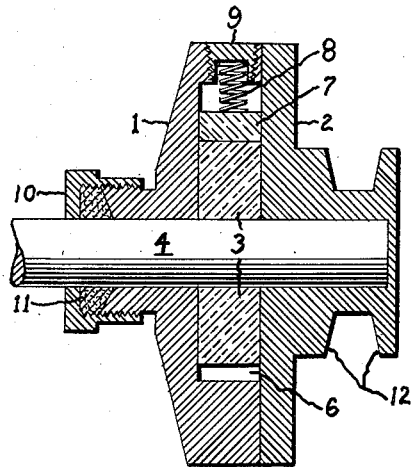
Inventor.
Alphonse Jos. Zak

UNITED STATES PATENT OFFICE 2,565,289

FLUID POWER TRANSMISSION

Alphonse Joseph Zak, Milwaukee, Wis.

Application March 8, 1948, Serial No. 13,653

1 Claim. (Cl. 64—28)

The invention relates to a fluid power transmission machine which transmits a revolving force from a power supply to a force expending machine.

The object of the invention is to create a means of power transmission that will be fluid to the extent of causing slippage within the machine when the power is applied suddenly against an inert resistance, and gradually overcoming the inertia without overloading the power source. Also, it shall be fluid to the extent that a slippage will occur when the resistance attains the maximum that is desired for the power source, thus avoiding overloads on the power source.

One form of the invention, a single V belt pulley, is illustrated in the accompanying drawing in which Figure 1 is a top view of the complete assembly; Figure 2 is a front view as it appears after the removal of the face plate and Figure 3 a sectional side view of part of the complete assembly on line 3—3 Figure 2.

The housing 1 with the face plate 2 encases a cam shaped impeller 3 which is fastened to a power driven shaft, that occupies the shaft opening 4, by a set screw 5. A suitable fluid occupies the cylinder area 6 which becomes compressed between the lift of the cam 3 and the cam activated gate valve 7 due to the revolving action of the cam 3 from a power source, and the resistance applied to the pulley 12. The resultant pressure of the fluid against the cam activated gate valve 7 tends to revolve the entire assembly. The cam activated gate valve 7 is pressed firmly against the cam 3 by a spring 8 which is held down by a screw 9. The packing nut 10 contains a suitable packing 11 to maintain the fluid within the cylinder area 6.

I am aware that prior to my invention fluid power transmission machines have been made, I therefore do not claim so broadly; but I claim:

A fluid power transmission machine comprising a driven shaft, a circular open mouth chambered housing loosely mounted upon the shaft a packing disposed about the shaft and against the housing, an adjustable packing nut carried by and extending from the housing receiving the packing and confining the packing about the shaft whereby leakage from the chamber is eliminated, a face plate secured to the housing for closing the chamber mouth, a pulley extending from the face plate forming a second bearing for the housing a circular rotor secured to the drive shaft of less diameter than the housing chamber, forming a confined fluid channel between the rotor face and chamber wall, the rotor being provided with a nose extension engaging the peripheral chamber wall, whereby the channel is separated into two compartments, and a yielding gate valve mounted in the housing engaging the rotor, whereby fluid is compressed in one of said compartments.

ALPHONSE JOSEPH ZAK.

REFERENCES CITED

The following references are of record in the file of this patent:

FOREIGN PATENTS

| Number | Country | Date |
|---|---|---|
| 12,063 | Great Britain | of 1906 |